United States Patent
Liang et al.

(10) Patent No.: US 12,191,482 B2
(45) Date of Patent: Jan. 7, 2025

(54) ELECTRODE ACTIVE MATERIAL AND PREPARATION METHOD THEREOF, ELECTRODE, BATTERY, AND APPARATUS

(71) Applicant: CONTEMPORARY AMPEREX TECHNOLOGY (HONG KONG) LIMITED, Hong Kong (CN)

(72) Inventors: Chengdu Liang, Ningde (CN); Yongchao Liu, Ningde (CN); Na Liu, Ningde (CN); Yingjie Guan, Ningde (CN); Qisen Huang, Ningde (CN); Wei Fu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/424,845

(22) Filed: Jan. 28, 2024

(65) Prior Publication Data
US 2024/0186491 A1    Jun. 6, 2024

Related U.S. Application Data

(63) Continuation of application No. 18/108,515, filed on Feb. 10, 2023, now Pat. No. 11,949,099, which is a continuation of application No. PCT/CN2020/114477, filed on Sep. 10, 2020.

(51) Int. Cl.
| | |
|---|---|
| *H01M 4/36* | (2006.01) |
| *C01G 53/00* | (2006.01) |
| *H01M 4/131* | (2010.01) |
| *H01M 4/505* | (2010.01) |
| *H01M 4/525* | (2010.01) |
| *H01M 4/58* | (2010.01) |

(52) U.S. Cl.
CPC ............ *H01M 4/366* (2013.01); *C01G 53/50* (2013.01); *H01M 4/131* (2013.01); *H01M 4/505* (2013.01); *H01M 4/525* (2013.01); *H01M 4/5825* (2013.01); *C01P 2004/51* (2013.01)

(58) Field of Classification Search
CPC ..................................................... H01M 4/366
See application file for complete search history.

(56) References Cited

U.S. PATENT DOCUMENTS

| | | | |
|---|---|---|---|
| 11,949,099 B2 * | 4/2024 | Liang | ................. H01M 4/1391 |
| 2016/0013476 A1 | 1/2016 | Oh et al. | |
| 2018/0145324 A1 | 5/2018 | Liu et al. | |

FOREIGN PATENT DOCUMENTS

| | | |
|---|---|---|
| CN | 104756300 A | 7/2015 |
| CN | 103022499 B | 9/2016 |
| CN | 108075111 A | 5/2018 |
| CN | 109216653 A | 1/2019 |
| CN | 111422920 A | 7/2020 |
| CN | 111146441 A | 12/2020 |
| JP | 2011082133 A | 4/2011 |

OTHER PUBLICATIONS

The extended European search report received in the corresponding European Application 20952770.4, mailed Apr. 12, 2023.
Contemporary Amperex Technology Co., Limited, International Search Report and Written Opinion, PCT/CN2020/114477, May 31, 2021, 9 pgs.

* cited by examiner

*Primary Examiner* — Peter F Godenschwager
(74) *Attorney, Agent, or Firm* — Kilpatrick Townsend & Stockton LLP

(57) ABSTRACT

The present invention relates to an electrode active material, a preparation method thereof, an electrode, a battery, and an apparatus. The electrode active material includes: a core and a coating layer, where the core includes a ternary material, the coating layer coats the core, the coating layer includes a reaction product of a sulfur-containing compound and a lithium-containing compound, and the reaction product includes element Li, element S, and element O.

20 Claims, 5 Drawing Sheets

ELECTRODE ACTIVE MATERIAL AND PREPARATION METHOD THEREOF, ELECTRODE, BATTERY, AND APPARATUS

CROSS-REFERENCE TO RELATED APPLICATION

This application is a continuation application of U.S. application Ser. No. 18/108,515, filed on Feb. 10, 2023, which is a continuation application of PCT Patent Application No. PCT/CN2020/114477, entitled "ELECTRODE ACTIVE MATERIAL AMD PREPARATION METHOD THEREFOR, ELECTRODE, BATTERY, AND DEVICE" filed on Sep. 10, 2020, all of which is incorporated herein by reference in its entirety.

TECHNICAL FIELD

This application relates to the field of lithium secondary battery technologies, and in particular, to an electrode active material and a preparation method thereof, an electrode, a battery, and an apparatus.

BACKGROUND

Since the first commercialization, rechargeable lithium-ion batteries have been widely used in various portable electronic products as well as in large electric vehicles and energy storage grids.

Positive-electrode active materials of lithium-ion batteries usually include lithium cobalt oxides (LCO), lithium manganese oxides (LMO), lithium iron phosphates (LFP), lithium nickel cobalt aluminum oxides (NCA), lithium nickel cobalt manganese oxides (NMC), and the like. Lithium ions can be reversibly intercalated and deintercalated in the foregoing positive-electrode materials.

However, electrode active materials with better performance are still in need in the field.

SUMMARY

This disclosure provides a new electrode active material with a coating layer, where the coating layer includes a reaction product of a sulfur-containing compound (sulfur-containing compound) and a lithium-containing compound (lithium-containing compound), and the reaction product includes element Li, element S, and element O. The electrode active material of this disclosure is applied to a battery, where the battery shows a reduced direct current resistance (DCR) growth rate during cycling.

In some aspects, this disclosure provides an electrode active material with a coating layer, including:
  a core, where the core includes a ternary material; and
  a coating layer, where the coating layer coats at least part of a surface of the core, the coating layer includes a reaction product of a sulfur-containing compound and a lithium-containing compound, and the reaction product includes element Li, element S, and element O.

In some embodiments, a weight content of element S in the electrode active material is 500-5000 ppm, for example, 500-1000 ppm, 1000-1500 ppm, 1500-2000 ppm, 2000-2500 ppm, 2500-3000 ppm, 3000-3500 ppm, 3500-4000 ppm, 4000-4500 ppm or 4500-5000 ppm, and for example, 540-4360 ppm.

In some embodiments, the coating layer further includes one or more of element B, element P, and element F;
  under a condition that element B is included, a weight content of element B in the electrode active material is 500-3000 ppm (for example 860-910 ppm);
  under a condition that element P is included, a weight content of element P in the electrode active material is 200-1500 ppm (for example, 690-870 ppm); and
  under a condition that element F is included, a weight content of element F in the electrode active material is 500-3000 ppm (for example, 1070-2100 ppm).

In some embodiments, the lithium-containing compound includes a lithium salt; and
  the lithium-containing compound includes one or more of the following: $Li_2O$, $LiOH$ and $Li_2CO_3$, $LiNO_3$, $LiPF_6$, lithium oxalate, lithium acetate, $LiClO_4$, $LiBF_4$, $LiCF_3SO_3$, $LiAsF_6$, $LiAlCl_4$, $LiN(CF_3SO_2)_2$ and $LiC(SO_2CF_3)_3$.

In some embodiments, the sulfur-containing compound is an organic sulfur-containing compound.

In some embodiments, the sulfur-containing compound includes one or more of the following: mercaptan, thiophenol, thioether, thioaldehyde, thioketone, thiocarboxylic acid, sulfoxide, sulfone, sulfur oxoacid, and derivatives thereof.

In some embodiments, the sulfur-containing compound includes one or more of the following: thioether (such as straight-chain thioether or cyclic thioether), sulfoxide, sulfone, sulfur oxoacid (such as sulfonic acid, sulfinic acid, or sulfenic acid), and derivatives thereof.

In some embodiments, the sulfur-containing compound includes one or more of the following: sulfoxide, sulfone, sulfur oxoacid (such as sulfonic acid, sulfinic acid, or sulfenic acid), and derivatives thereof.

In some embodiments, derivatives of the sulfur oxoacid include one or more of the following: an ester of the sulfur oxoacid, a salt of the sulfur oxoacid (in some embodiments, a lithium salt of the sulfur oxoacid), an acyl halide of the sulfur oxoacid, an amide of the sulfur oxoacid, and a lithium amide salt of the sulfur oxoacid.

In some embodiments, the sulfur oxoacid is an organic sulfur oxoacid.

In some embodiments, the sulfur oxoacid is sulfonic acid, sulfinic acid, or sulfenic acid.

In some embodiments, derivatives of the sulfur oxoacid include one or more of the following: an ester of the sulfur oxoacid, a salt of the sulfur oxoacid (in some embodiments, a lithium salt of the sulfur oxoacid), an acyl halide of the sulfur oxoacid, an amide of the sulfur oxoacid, and a lithium amide salt of the sulfur oxoacid.

In some embodiments, the sulfur-containing compound includes one or more of the following:
  $R1-S(=O)_2-R2$, $R1-C(=S)-R2$,

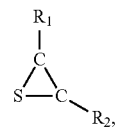

$R1-C-S-C-R2$, or $R1-S(=O)_2-LiN-S(=O)_2-R2$, where R1 and R2 each are selected from hydroxyl, amino, $C_{1-6}$ alkyl, aryl, a halogen atom (for example, F, Cl, Br, or I), and a hydrogen atom.

In some embodiments, the sulfur-containing compound includes $R1-S(=O)_2-R2$, where R1 is hydroxyl, and R2 is selected from amino, $C_{1-6}$ alkyl, and the halogen atom (for example, F, Cl, Br, or I).

In some embodiments, the sulfur-containing compound includes R1-C(=O)2-R2, where R1 is amino, and R2 is $C_{1-6}$ alkyl.

In some embodiments, the sulfur-containing compound includes

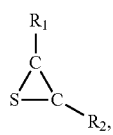

where R1 and R2 each are a hydrogen atom or $C_{1-6}$ alkyl.

In some embodiments, the sulfur-containing compound includes R1-C—S—C—R2, where R1 and R2 each are a hydrogen atom or $C_{1-6}$ alkyl.

In some embodiments, the sulfur-containing compound includes R1-S(=O)$_2$—LiN—S(=O)$_2$—R2, where R1 and R2 each are a halogen atom.

In some embodiments, the sulfur-containing compound includes one or more of the following: sulfamide, aminomethanesulfonic acid, lithium bisfluorosulfonimide, thiopropionamide, thio-isobutyramide, propylene sulfide, and methyl ethyl sulfide.

In some embodiments, the sulfur-containing compound includes one or more of the following: sulfamide, aminomethanesulfonic acid, lithium bisfluorosulfonimide, thiopropionamide, thio-isobutyramide, propylene sulfide, and methyl ethyl sulfide.

In some embodiments, the sulfur-containing compound includes one or more of the following:

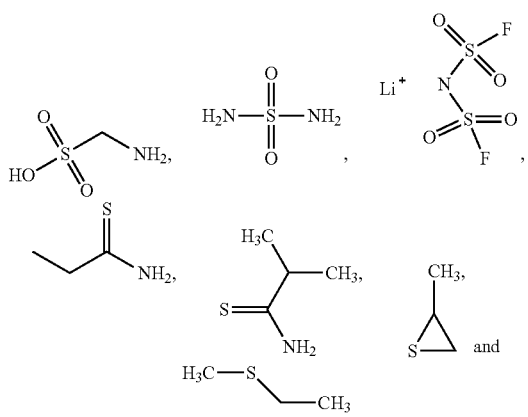

In some embodiments, $C_{1-6}$ alkyl is substituted by amino. For example, $C_{1-6}$ alkyl is aminomethyl.

In some embodiments, $C_{1-6}$ alkyl is selected from methyl, ethyl, propyl, butyl, pentyl, and hexyl.

In some embodiments, the lithium-containing compound and the sulfur-containing compound are two different compounds.

In some embodiments, the reaction product of the sulfur-containing compound and the lithium-containing compound is a Li—S—O compound.

In some embodiments, the reaction product of the sulfur-containing compound and the lithium-containing compound includes one or more of the following: a sulfur-containing compound substituted by lithium, lithium sulfate, and lithium sulfite.

In some embodiments, the ternary material includes one or more of the following: lithium nickel cobalt manganese oxides and lithium nickel cobalt aluminum oxides;

a chemical formula of the lithium nickel cobalt manganese oxides is $Li_xNi_aCO_bMn_cM^1_{(1-a-b-c)}O_2$, where $0.5 \le x \le 1.2$, $0.3 \le a \le 1$, $0 \le b \le 0.5$, $0 \le c \le 0.6$, and $M^1$ is selected from a combination of one or more of Zr, Zn, Ti, Sr, Sb, Y, W, Al, B, P, and F.

In some embodiments, x=0.5-0.6, 0.6-0.7, 0.7-0.8, 0.8-0.9, 0.9-1, 1-1.1, or 1.1-1.2.

In some embodiments, a=0.3-0.4, 0.4-0.5, 0.5-0.6, 0.6-0.7, 0.7-0.8, 0.8-0.9, or 0.9-1.

In some embodiments, b=0-0.1, 0.1-0.2, 0.2-0.3, 0.3-0.4, or 0.4-0.5.

In some embodiments, c=0-0.1, 0.1-0.2, 0.2-0.3, 0.3-0.4, 0.4-0.5, or 0.5-0.6.

In some embodiments, a chemical formula of the lithium nickel cobalt aluminum oxides is $Li_xNi_dCo_eAl_fM^2_{(1-d-e-f)}O_2$, where $0.5 \le x \le 1.2$, $0.5 \le d \le 1$, $0 \le e \le 0.5$, $0 \le f \le 0.5$, and $M^2$ is selected from a combination of one or more of Zr, Mg, Ba, Ti, Sr, Sb, Y, W, and B.

In some embodiments, x=0.5-0.6, 0.6-0.7, 0.7-0.8, 0.8-0.9, 0.9-1, 1-1.1, or 1.1-1.2.

In some embodiments, d=0.5-0.6, 0.6-0.7, 0.7-0.8, 0.8-0.9, or 0.9-1.

In some embodiments, e=0-0.1, 0.1-0.2, 0.2-0.3, 0.3-0.4, or 0.4-0.5

In some embodiments, f=0-0.1, 0.1-0.2, 0.2-0.3, 0.3-0.4, 0.4-0.5.

In some embodiments, the electrode active material includes:

a core, where the core includes a ternary material; and a first coating layer, where the first coating layer coats at least part of a surface of the core, and the first coating layer includes element Al, for example, the first coating layer includes aluminum oxide, aluminum fluoride, and aluminum phosphate;

a second coating layer, where the second coating layer coats at least part of the surface of the core, the second coating layer includes the reaction product of the sulfur-containing compound and the lithium-containing compound, and the reaction product includes element Li, element S, and element O; and the first coating layer and the second coating layer have different compositions.

Unless otherwise specified, the coating layer mentioned in this disclosure is a coating layer that includes the reaction product of the sulfur-containing compound and the lithium-containing compound.

In some embodiments, a particle size ($D_v50$ particle size) of the electrode active material is 1-25 μm, for example, 1-10 μm.

In some aspects, this disclosure provides a preparation method of an electrode active material with a coating layer, including:

(a) providing a core material and a coating layer forming material, where the core material includes a ternary material, and the coating layer forming material includes a sulfur-containing compound;

where step (a) includes one or more characteristics of the following (a1) and (a2):

(a1) a surface of the core material includes a lithium-containing compound;

(a2) the coating layer forming material further includes the lithium-containing compound; and (b) processing the core material by using the coating layer forming material, so that a reaction product of the sulfur-containing compound and the lithium-containing compound is formed on the surface of the core material, and the reaction product includes element Li, element S, and element O.

In some embodiments, in (a1), the lithium-containing compound is an alkaline lithium-containing compound.

In some embodiments, in (a2), the lithium-containing compound is a neutral lithium-containing compound or an acidic lithium-containing compound.

In some embodiments, the coating layer further includes one or more of element B, element P, and element F;
- under a condition that element B is included, a molar ratio of element B to element S is 2-5:4-7 (for example, 2-5:5-7) in the coating layer forming material;
- under a condition that element P is included, a molar ratio of element P to element S is 1-3:4-6 (for example, 2:5) in the coating layer forming material; and
- under a condition that element F is included, a molar ratio of element F to element S is 10-15:4-6 (for example, 12:5) in the coating layer forming material.

In some embodiments, the processing the core material by using the coating layer forming material includes: applying a solution containing the coating layer forming material to the surface of the core material, and performing heat treatment;
- a heat treatment temperature is 80-300° C.; and
- a heat treatment time is 3-20 hours.

In some embodiments, the applying a solution containing the coating layer forming material to the surface of the core material includes: dispersing the core material in the solution dissolved with the coating layer forming material, then separating the core material from the solution.

In some embodiments, in the solution containing the coating layer forming material, a concentration of the sulfur-containing compound is 0.1-5 mol/L (for example, 0.2-2 mol/L).

In some embodiments, in the solution containing the coating layer forming material, a concentration of the lithium-containing compound is 0.1-3 mol/L (for example, 0.3-0.5 mol/L).

In some embodiments, in the solution containing the coating layer forming material, a solvent includes one or more of the following substances: water, ethanol, and NMP, and the solvent is alcohol with a concentration of 90-95 vol %.

In some embodiments, the lithium-containing compound is as defined in any one of the foregoing embodiments.

In some embodiments, the sulfur-containing compound is as defined in any one of the foregoing embodiments.

In some embodiments, the ternary material is as defined in any one of the foregoing embodiments.

In some aspects, an electrode active material with a coating layer is provided and obtained by the preparation method according to any one of the foregoing embodiments.

In some aspects, an electrode is provided, including the electrode active material according to any one of the foregoing embodiments.

In some aspects, a battery is provided, including the electrode active material according to any one of the foregoing embodiments.

In some aspects, an apparatus is provided, including the battery according to any one of the foregoing embodiments, where the battery is used as an energy storage unit of the apparatus.

In some embodiments, the apparatus is an electric apparatus, and the battery is configured to power the electric apparatus.

In some embodiments, a method for preparing an electrode active material with a coating layer is a wet method.

In some aspects, an apparatus is provided, including the foregoing battery, where the battery is used as an energy storage unit of the apparatus.

In some embodiments, an electrolyte for the battery can be selected based on needs. The electrolyte can be selected from at least one of a solid electrolyte and a liquid electrolyte (that is, an electrolyte). When the electrolyte is an electrolyte solution, the electrolyte solution includes an electrolytic salt and a solvent. The electrolytic salt may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroborate), LiFSI (lithium bisfluorosulfonylimide), LiTFSI (lithium bistrifluoromethanesulfonimide), LiTFS (lithium trifluoromethanesulfonat), LiDFOB (lithium difluorooxalatoborate), LiBOB (lithium bisoxalatoborate), $LiPO_2F_2$ (lithium difluorophosphate), LiDFOP (lithium difluorophosphate), and LiTFOP (lithium tetrafluoro oxalate phosphate). The solvent may be one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methylmethyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), tetramethylene sulfone (SF), methyl sulfone (MSM), ethyl methyl sulfone (EMS), and diethyl sulfone (ESE).

In some embodiments, the battery includes a separator, where the separator is sandwiched between a positive electrode and a negative electrode for separation.

In some embodiments, the separator may be any commonly known porous separator with good chemical stability and mechanical stability, for example, one or more of glass fiber, non-woven fabric, polyethylene, polypropylene and polyvinylidene fluoride. The separator may be a single-layer thin film or a multi-layer composite thin film. When the separator is a multilayer composite film, each layer may be made of the same or different materials.

In some embodiments, the apparatus is an electric apparatus, and the battery is configured to power the electric apparatus.

In some embodiments, the electric apparatus may be electrical appliances, such as household appliances, commercial appliances, and industrial appliances.

In some embodiments, the electric apparatus may be an electric transport, for example, an electric vehicle. The electric transport vehicles may be driven by either purely electricity or hybrid power.

In some embodiments, "comprising", "including", and "containing" may refer to a weight content greater than 0, for example, above 1%, above 10%, above 20%, above 30%, above 40%, above 50%, above 60%, above 70%, above 80%, above 90%, and 100%. When the percentage is 100%, "comprising", "including", and "containing" means "consisting of".

For simplicity, only some numerical ranges are expressly disclosed in this specification. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, although not expressly recorded, each point or individual value between endpoints of a range is included in the range. Therefore, each site or single numerical value can be used as its own lower limit or upper limit in combination with any other site or single numerical value or in combination with other lower or upper limits to form a range not expressly recorded.

In the descriptions of this specification, it should be noted that "more than" or "less than" is inclusive of the present number and that "more" in "one or more" means two or more than two, unless otherwise specified.

The foregoing summary is not intended to describe each of the disclosed embodiments or implementations of this application. The following description illustrates exemplary embodiments in more detail by using examples. Throughout this application, guidance is provided by using a series of embodiments and the embodiments may be used in various combinations. In each example, enumeration is only representative but should not be interpreted as exhaustive.

TERM INTERPRETATION

Where the following terms are used in the present invention, they can be understood in the following non-limiting manner.

The "electrode active material" is a battery material with a specific composition and a crystal structure for intercalating and deintercalating lithium ions.

The "electrode" is a component that participates in an electrochemical reaction of the battery and that includes the electrode active material.

The "battery" is a single physical module that includes one or more battery cells for providing a higher voltage and capacity. The "battery cell" is a battery cell that can be charged and discharged independently. A cell structure includes a positive electrode, a negative electrode, a separator, an electrolyte, an outer package for packaging a positive-electrode plate, a negative-electrode plate, the separator, and the electrolyte, and the like. The type and shape of the battery cell are not specifically limited in this application. The battery cell may be a soft package battery cell, or may be a cylinder cell, a prismatic cell, or another type of cell.

The battery may include a battery cell, a battery module, and a battery pack. The battery module is formed by electrically connecting a specific quantity of battery cells and putting the battery cells into a frame to protect the battery cells from external impact, heat, vibration, and the like. The battery pack is a final state of a battery system assembled in an electric apparatus such as an electric vehicle. Most existing battery packs are formed by assembling various control and protection systems such as a battery management system and a thermal management part on one or more battery modules. With the development of technologies, the battery module may be omitted, that is, the battery pack is directly formed using battery cells. With this improvement, weight energy density and volumetric energy density of the battery system are improved, and the number of parts is remarkably reduced.

The "single crystal" is also referred to as a single particle or a primary particle, and in terms of micro morphology, the single crystal is a particle that substantially does not agglomerate or disperse. The single crystal may be a particle with an irregular shape.

The "polycrystal" is a secondary particle formed by agglomeration of more than two primary particles. The polycrystal may be a spherical particle.

The terms "powder" and "particle" may be used interchangeably in this specification. These terms further randomly have the following features: hollow, dense, porous, semiporous, coated, uncoated, multi-layer, laminated, simple, complex, dendritic, inorganic, organic, elemental, non-elemental, compound, doped, undoped, spherical, non-spherical, surface-functional, non-surface-functional, stoichiometric, and non-stoichiometric forms or substances. In addition, the term "powder" generally includes a one-dimensional material (fiber, tube, or the like), a two-dimensional material (a slice, a thin film, a laminated material, a flat surface, or the like), and a three-dimensional material (a sphere, a cone, an oval, a cylinder, a cube, a homocline, a dumb-bell shape, a hexagon, a truncated icosahedron, an irregular structure, or the like).

The term "sphere" herein is a regular sphere, an ellipsoid, or a sphere-like shape.

The term "Dv10" herein is a volume-based particle size at the 10-th percentile; the term "$D_v50$" is a volume-based particle size at the 50-th percentile; and the term "Dv90" is a volume-based particle size at the 90-th percentile. The particle size is measured by using a laser diffraction method.

The term "lithium salt" is a lithium-containing compound that can dissociate in a solvent to produce lithium ions.

The term "mercaptan" refers to replacement of alcoholic hydroxyl in an ethanol molecule with —SH.

The term "thiophenol" refers to replacement of a phenolic hydroxyl in a phenol molecule with —SH.

The term "thioether" is a compound with an R3—S—R4 structure, where R3 and R4 are each independently alkyl.

The term "thioaldehyde" refers to replacement of aldehyde C(O)H in an aldehyde molecule with C(S)H.

The term "thioketone" refers to replacement of carbonyl —C(O)— in a ketone molecule with —C(S)—.

The term "thiocarboxylic acid" refers to replacement of —COOH in a carboxylic acid molecule with CO—SH, CS—OH, or CSSH.

The term "sulfone" is a compound having a group —S(O)$_2$R, where R is alkyl, aryl, or heteroaryl.

The term "sulfoxide" is a compound with a group —S(O)R, where R is alkyl, aryl, or heteroaryl.

The terms "sulfonic acid", "sulfinic acid", and "sulfenic acid" are compounds with —S(O)$_2$OH, —S(O)OH, and —SOH respectively.

The term "amino" is unsubstituted or substituted amino. The substituted amino is, for example, alkyl-substituted amino, for example, methylamino.

The term "$C_{1-6}$ alkyl" refers to alkyl with 1 to 6 carbon atoms, and may be branched or straight-chain, saturated or unsaturated, and unsubstituted or mono/poly-substituted.

BENEFICIAL EFFECTS

This disclosure provides an electrode active material with a coating layer, including a core and a coating layer, where the core includes a ternary material; and the coating layer coats the core, the coating layer includes a reaction product of a sulfur-containing compound and a lithium-containing compound, and the reaction product includes element Li, element S, and element O.

One or more technical solutions recorded in this disclosure have one or more of the following beneficial effects:
1) The electrode active material or a composition is applied to a battery, showing an increased specific capacity;

2) The electrode active material or a composition is applied to a battery, showing improved cycling performance;
3) The electrode active material or a composition is applied to a battery, showing a reduced direct current resistance growth rate during cycling;
4) The electrode active material or a composition is applied to a battery, showing lower gas production;
5) The electrode active material or a composition is applied to a battery, with the battery showing better performance at a higher voltage; and
6) Slurry prepared at higher humidity by using the electrode active material or a composition still has good processing performance and/or electrical performance.

DESCRIPTION OF EMBODIMENTS

Figure 1:
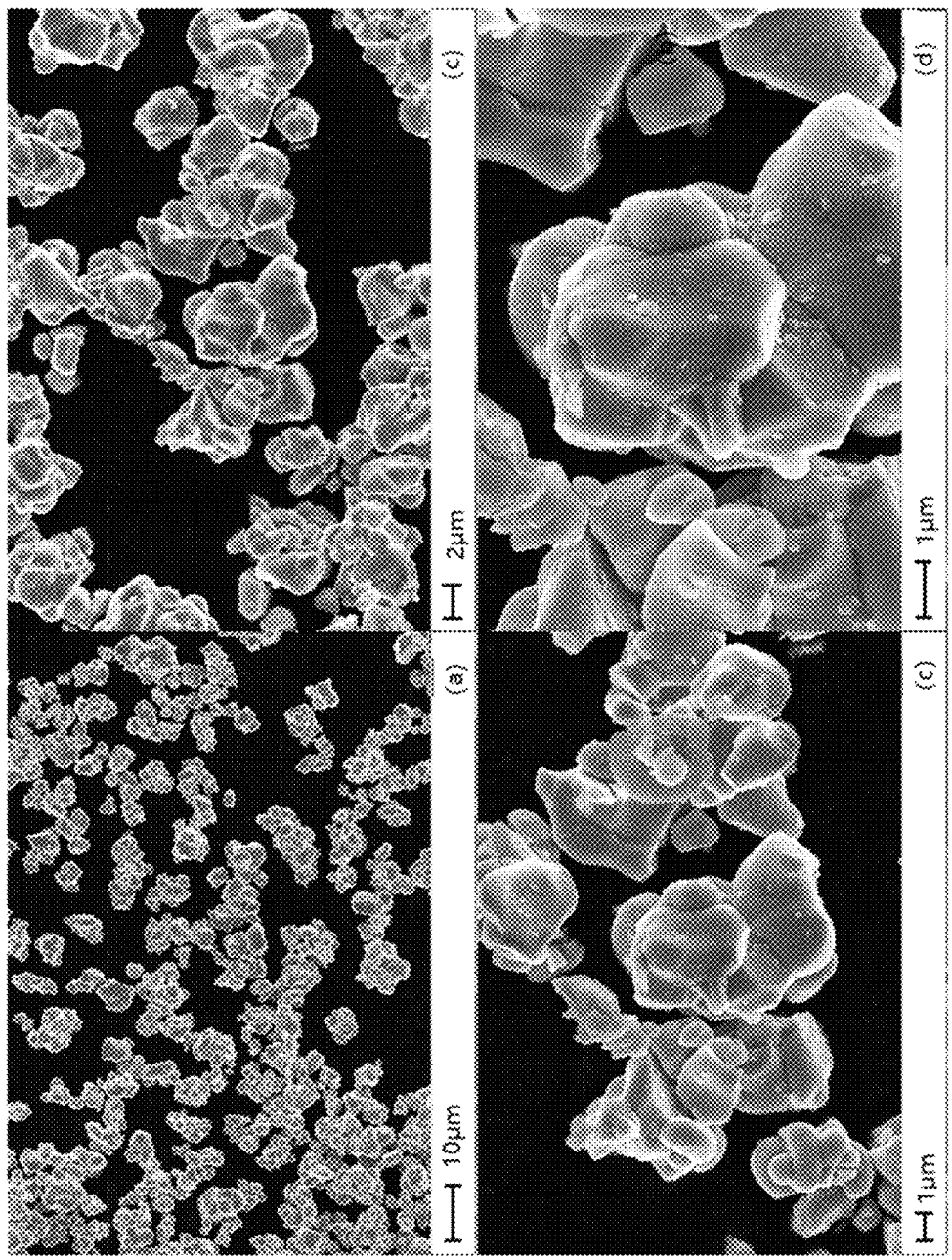
FIG. 1 shows scanning electron microscope images of a lithium nickel cobalt manganese oxide numbered 10, with (a)-(d) showing images at different magnifications or positions.

The following embodiments specifically describe an electrode active material with a coating layer and a preparation method thereof. A battery is assembled by using the electrode active material, and tested for one or more of the following performance: capacity retention rate, direct current resistance, gas production, and slurry processing performance.

The following embodiments describe in more detail content disclosed in this application. These embodiments are intended only for illustrative purposes because various modifications and changes made without departing from the scope of the content disclosed in this application are apparent to those skilled in the art. Unless otherwise stated, all parts, percentages, and ratios reported in the following embodiments are based on weights, all reagents used in the embodiments are commercially available or synthesized in a conventional manner, and can be used directly without further processing, and all instruments used in the embodiments are commercially available.

1. Electrode Active Material Powder (Core Material)

The electrode active material powder as a core material is a commercially available ternary material, specifically, NCMs 1-4 are lithium nickel cobalt manganese oxides and NCA is a lithium nickel cobalt aluminum oxide. Due to a preparation process, residual lithium is present on a surface of the core material. Relevant parameters of the core material are shown in the following table:

| No. | Chemical formula | Morphological feature | $D_v10$ | $D_v50$ | $D_v90$ | Residual lithium content* |
|---|---|---|---|---|---|---|
| NCM1 | $LiNi_{0.82}Co_{0.118}Mn_{0.058}Zr_{0.004}O_2$ | Single crystal | 1.8 | 3.6 | 7.2 | 0.21% |
| NCM2 | $LiNi_{0.644}Co_{0.098}Mn_{0.252}Ti_{0.006}O_2$ | Single crystal | 1.54 | 3.23 | 6.6 | 0.08% |
| NCM3 | $LiNi_{0.548}Co_{0.05}Mn_{0.40}Sr_{0.002}O_2$ | Single crystal | 1.81 | 3.76 | 7.44 | 0.06% |
| NCM4 | $LiNi_{0.818}Co_{0.119}Mn_{0.059}Zr_{0.002}Sr_{0.002}O_2$ | Polycrystal | 5.39 | 10 | 17.4 | 0.26% |
| NCA | $LiNi_{0.83}Co_{0.10}Al_{0.065}Ba_{0.005}O_2$ | Polycrystal | 5.21 | 9.53 | 16.2 | 0.31% |

*A method for determining residual lithium content is as follows:

Reference standard: GB/T 9725-2007 Chemical reagent—general rule for potentiometric titration Device parameters: 905 Ttrando potentiometric titrator; electrode: composite pH electrode; reagent: 0.5 mol/L of HCl solution; environmental parameters: 15-28° C., ambient humidity less than or equal to 80%

Test method: 30 g of a sample is weighted, mixed and stirred with 100 g of deionized water, and left standing; upon suction filtration, a filtrate was subjected to potentiometric titration with 0.5 mol/L of HCL solution by using the 905 Ttrando potentiometric titrator, and contents of $CO_3^{2-}$ and $OH^-$ in the filtrate were determined; and conversions were performed according to a stoichiometric ratio of $Li_2CO_3$ and LiOH, with 1 mol of $CO_3^{2-}$ corresponding to 2 mol of element Li, and 1 mol of $OH^-$ corresponding to 1 mol of element Li, and a residual lithium weight content based on element Li was obtained after summation.

2. Coating Method

Step 1: providing the ternary material as a core material.
Step 2: providing a solution containing a coating layer formation material, where a formula of the solution containing the coating layer formation material is shown in Table 1.
Step 3: mixing the products in step 1 and step 2 at a weight ratio of 1:1, stirring for 30 minutes after the mixing, and upon solid-liquid separation, collecting solids.
Step 4: performing heat treatment to the solids obtained in the previous step in an inert atmosphere in a closed environment to obtain an electrode active material with a coating layer, with heat treatment conditions shown in Table 1.

In the foregoing example, an alkaline lithium-containing compound (such as $Li_2O$, LiOH, and $Li_2CO_3$) was present on the surface of the core material, and the alkaline lithium-containing compound reacted with a sulfur-containing compound during a coating process, producing a reaction product of the sulfur-containing compound and the lithium-containing compound, where the reaction product included element Li, element S, and element O.

After the coating treatment was performed on the core material based on the foregoing method, an electrode active material with a coating layer was obtained. Specific process parameters are shown in Table 1.

was added, with a mass of the solvent accounting for 30% of a total weight of a slurry, to produce a uniform positive-

TABLE 1

| | Core material | Solution containing a coating layer formation material | | | | | | | Heat treatment Parameter | |
|---|---|---|---|---|---|---|---|---|---|---|
| | | | | | Lithium- | | | | | |
| | Chemical formula | Solvent | Sulfur-containing compound | Concentration (mol/L) | containing compound | Concentration (mol/L) | Another compound | Concentration (mol/L) | Temperature (° C.) | Time (h) |
| 1 | NCM1 | 95% ethanol | Sulfamide | 0.5 | N/A | / | N/A | / | 175 | 8 |
| 2 | NCM2 | 95% ethanol | Aminomethanesulfonic acid | 0.4 | N/A | / | N/A | / | 245 | 8 |
| 3 | NCM3 | Deionized water | lithium bisfluorosulfonimide | 5 | N/A | / | N/A | / | 265 | 8 |
| 4 | NCM1 | 95% ethanol | Sulfamide | 0.2 | $LiNO_3$ | 0.5 | N/A | / | 245 | 8 |
| 5 | NCM1 | 95% ethanol | Sulfamide | 0.8 | $Li_2C_2O_4$ | 0.3 | N/A | / | 245 | 8 |
| 6 | NCM1 | 95% ethanol | Sulfamide | 2.0 | $LiC_2H_3O_2$ | 0.3 | N/A | / | 175 | 8 |
| 7 | NCM1 | Deionized water | Sulfamide | 0.7 | N/A | / | $H_3BO_3$ | 0.5 | 150 | 20 |
| 8 | NCM1 | 95% ethanol | Sulfamide | 0.5 | N/A | / | $Li_3PO_4$ | 0.2 | 225 | 8 |
| 9 | NCM1 | 95% ethanol | Sulfamide | 0.5 | N/A | / | $LiPF_6$ | 0.2 | 270 | 8 |
| 10 | NCM1 | 95% ethanol | Sulfamide | 0.5 | N/A | / | $LiPF_6$ + $H_3BO_3$ | 0.2 + 0.2 | 300 | 8 |
| 11 | NCM1 | / | / | / | / | / | / | / | / | / |
| 12 | NCM2 | / | / | / | / | / | / | / | / | / |
| 13 | NCM3 | / | / | / | / | / | / | / | / | / |
| 14 | NCA | 95% ethanol | Sulfamide | 0.5 | N/A | | N/A | / | 245 | 8 |
| 15 | NCA | 95% ethanol | Sulfamide | 0.5 | $LiNO_3$ | 0.5 | N/A | / | 245 | 12 |
| 16 | NCA | 95% ethanol | Aminomethanesulfonic acid | 0.4 | $Li_2C_2O_4$ | 0.3 | N/A | / | 245 | 6 |
| 17 | NCA | 95% ethanol | lithium bisfluorosulfonimide | 0.3 | $LiC_2H_3O_2$ | 0.3 | N/A | / | 245 | 4 |
| 18 | NCA | / | / | / | / | / | / | / | / | / |
| 19 | NCM4 | 95% ethanol | Sulfamide | 0.5 | N/A | | N/A | / | 200 | 8 |
| 20 | NCM4 | 95% ethanol | Sulfamide | 0.5 | $LiNO_3$ | 0.5 | N/A | / | 80 | 16 |
| 21 | NCM4 | NMP | lithium bisfluorosulfonimide | 0.4 | $Li_2C_2O_4$ | 0.3 | N/A | / | 300 | 3 |
| 22 | NCM4 | 95% ethanol | Aminomethanesulfonic acid | 0.4 | $LiC_2H_3O_2$ | 0.3 | N/A | / | 200 | 8 |
| 23 | NCM4 | 95% ethanol | Aminomethanesulfonic acid | 0.4 | $LiC_2H_3O_2$ | 0.5 | N/A | / | 200 | 8 |
| 24 | NCM4 | / | / | / | / | / | / | / | / | / |

$Li_2C_2O_4$ is lithium oxalate with a CAS number of 533-91-3.
$LiC_2H_3O_2$ is lithium acetate with a CAS number of 6108-17-4.
95% alcohol is an aqueous solution of ethanol with a concentration of 95 vol %.
Deionized water refers to deionized water with conductivity less than or equal to 0.5 μs/cm.
NMP refers to an aqueous solution of N-methylpyrrolidone with a concentration of 99% or more.

Material Physical Performance and Electrical Performance Test 24 samples are shown in Table 1, including coated and uncoated electrode active materials. These 24 samples are tested by using the following test methods.

I. Preparation of a Battery

Preparation of a positive-electrode plate: At 2% environmental humidity, the electrode active material prepared in the foregoing examples/comparative examples was mixed with conductive carbon black and a binder PVDF at a mass ratio of 96:2.5:1.5. A solvent N-methylpyrrolidone (NMP) electrode slurry after stirring. The positive-electrode slurry was evenly applied on both sides of a positive-electrode collector aluminum foil, the aluminum foil was cold pressed by using a roller press to obtain a positive-electrode plate, and a press density of the obtained positive-electrode plate was 3.5-4.0 g/cc.

Preparation of a negative-electrode plate: Artificial graphite was used as a negative-electrode active substance. In a negative-electrode slurry, solid components were formed by the artificial graphite, styrene polybutadiene rubber (SBR), sodium carboxymethyl cellulose (CMC), and conductive carbon black at a ratio of 96:2:1:1. A solvent of the slurry was water, and the solvent accounted for 50% of weight of the slurry. The negative-electrode slurry was evenly applied on both sides of a negative-electrode current collector copper foil, the copper foil was cold pressed by using a roller press to obtain a negative-electrode plate, and a press density of the negative-electrode plate was 1.65 g/cc.

Separator: A PP/PE composite separator was used.

Electrolyte: 1 mol/L of $LiPF_6$ solution was selected. Its solvent mainly includes ethylene carbonate (EC), ethyl methyl carbonate (EMC), and diethyl carbonate (DEC).

Assembly of a battery: The negative-electrode plate, the separator, and the positive-electrode plate were stacked and then wound. After a roll core was obtained, a tab was welded on the copper and aluminum foil current collectors of the positive-electrode plate and the negative-electrode plate exposed from the core, and all are encapsulated in a packaging bag made of aluminum-plastic composite material. A thickness of the packaging bag was 153 μm. An electrolyte was injected and then the bag was sealed. Chemical conversion was performed at 45° C. After the chemical conversion, gas generated by the chemical conversion was extracted and excess packaging bags were removed to obtain a battery with a height of 130 mm, a thickness of 4 mm, and a width of 60 mm.

II. First-Cycle Discharge Specific Capacity and Testing Method

The battery was charged and discharged at a constant test room temperature (25° C.) by using a Neware charge and discharge machine (5V/6A). A charging and discharging method was as follows:
1. The battery was left standing for 10 minutes at a constant temperature of 25° C.
2. The battery was charged at a constant current rate of 0.33 C to a charge cut-off voltage (charge cut-off voltages of battery cells corresponding to different active materials are shown in the following table) and then charged at a constant voltage of the charge cut-off voltage until a charge current was less than or equal to 0.05 C;

TABLE 2

| Electrode active material | Charge cut-off voltage of battery cell |
|---|---|
| NCM1, NCM4, NCA | 4.2 V |
| NCM2, NCM3 | 4.35 V |

3. The battery was left standing for 5 minutes;
4. The battery was discharged at a constant current rate of 0.33 C to a discharge cut-off voltage (in the following examples, the discharge cut-off voltage is set to 2.8 V and may be adjusted based on different to-be-detected batteries);

A first-cycle discharge specific capacity was determined as a test result.

The charge/discharge current was a preset rate multiplied by a rated capacity of the battery cell. The rated capacity is based on a cell capacity identified in a GBT certification document for the cell, or the battery module to which the cell belongs, or the battery pack to which the cell belongs.

III. Method for Testing a Capacity Retention Rate

A high/low temperature chamber of 220L from Tengda was used for testing. A charging and discharging method is as follows:

1. The chamber was adjusted to a preset temperature and left standing for 2 hours;
2. The battery was charged at a constant current rate of 1 C to a charge cut-off voltage (cut-off voltages for different active materials are shown above), and then charged at a constant voltage of the charge cut-off voltage until a charge current was less than or equal to 0.05 C;
3. The battery was left standing for 5 minutes;
4. The battery was discharged at a constant current rate of 1 C to a discharge cut-off voltage (a discharge cut-off voltage used in the following examples is specifically 2.8 V);
5. The battery was left standing for 5 minutes;
6. Steps 2-5 are repeated.

IV. Method for Testing Gas Production

After fully charged, the battery cell was stored in a high-temperature furnace at 70° C. At regular intervals, the battery cell was taken out of the furnace and a volume of the battery was measured by using a drainage method. A volume change before and after the storage was found after comparison, and a volume change rate of the gas production was obtained.

V. Method for Extracting a DCR Growth Rate During Cycling

During cycling, an average voltage/average current 30 seconds before charging to 100% SOC is extracted for each cycle to obtain a DCR at a corresponding number of cycles. After DCRs are extracted by the number of cycles, a DCR growth rate during the cycling is obtained.

VI. Method for Testing a Particle Size Distribution

A laser particle size test was performed by using a Mastersizer 3000E laser particle size analyzer from Malvern instruments Ltd in UK. A test method can be referred to a GB/T 19077-2016 particle size distribution laser diffraction method. In the test, the electrode active material was dispersed in water to obtain a particle refractive index of 1.69.

A method for testing a particle size of electrode active material in the finished electrode is as follows: powder was scraped from the positive-electrode plate, the scraped powder was collected, put in a sintering furnace, and sintered at 600° C. for 4 hours to remove conductive carbon and binder from the powder and obtain an electrode active material. A laser particle size test was performed on the electrode active material by using a Mastersizer 3000E laser particle size analyzer.

VII. Method for Testing Contents of Element Sulfur, Element Boron, and Element Phosphorus Testing method: inductively coupled plasma atomic emission spectrometry
Instrument model: ICP-OES, Thermo ICAP7400
Sample weight: 0.4 g
Digestion method: plate digestion
Type and volume of acids used for digestion: 10 mL of aqua regia (concentrated nitric acid: concentrated hydrochloric acid (volume ratio)=1:1)
Constant volume: 100 mL
Quantitative method: standard curve method

VIII. Method for Testing Content of Element Fluorine

Instrument model: ICS-900 ion chromatography instrument

Reference standard: General Rules for Ion Chromatography JY/T202-1996

Measurement method: 0.4 g of the electrode active material was completely digested in 10 mL of aqua regia (concentrated nitric acid: concentrated hydrochloric acid (volume ratio)=1:1), and an obtained solution was diluted to 250 mL for measurement.

Detailed Description of Test Results of the Electrode Active Material

Test results obtained by testing samples 1-24 based on the foregoing methods are described in detail below.

1. Micro-Morphology and Particle Size (1) Micro-Morphology

FIG. 1 shows scanning electron microscope images of an electrode active material numbered 10, with (a)-(d) sequentially showing images at scales of 10 μm, 2 μm, 1 μm, and 1 μm. Particles of the electrode active material have irregular particle shapes, with a single crystal micro-structure.

Figure 2:
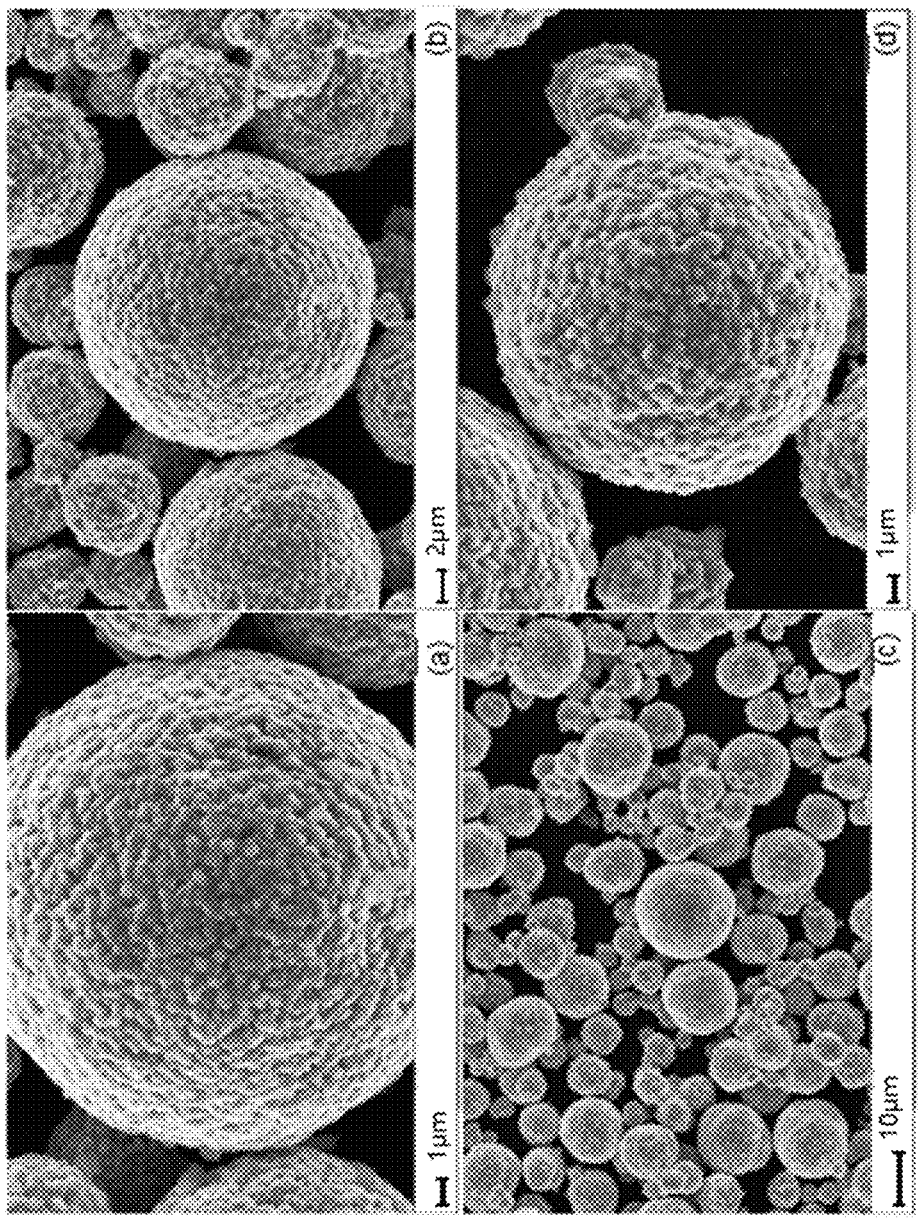
FIG. 2 shows scanning electron microscope images of a lithium nickel cobalt manganese oxide numbered 24, with (a)-(d) showing images at different magnifications or positions.

FIG. 2 shows scanning electron microscope images of an electrode active material numbered 24, with (a)-(d) sequentially showing images at different magnifications or positions. (a)-(d) sequentially show images at scales of 10 μm, 2 μm, 1 μm, and 1 μm. Particles of the electrode active material have a spherical particle shape, with a polycrystal micro-structure.

(2) Particle Size Distribution

Particle size distributions of the electrode active materials numbered 1, 2, 3, 14, and 21 are as follows:

TABLE 3

| Item | Sample | | | | |
|---|---|---|---|---|---|
| | 1 | 2 | 3 | 14 | 21 |
| Dv10 | 1.7 | 1.58 | 1.63 | 5.39 | 5.20 |
| Dv50 | 3.5 | 3.32 | 3.36 | 9.73 | 9.51 |
| Dv90 | 7.2 | 6.65 | 7.29 | 16.50 | 16.4 |

(3) Element Content Test

Contents of element S, element B, element P, and element F in the electrode active materials numbered 1-24 are as follows:

TABLE 4

| Number | Element S (ppm) | Element B (ppm) | Element P (ppm) | Element F (ppm) |
|---|---|---|---|---|
| 1 | 1600 | \ | \ | \ |
| 2 | 1060 | \ | \ | \ |
| 3 | 840 | \ | \ | 1070 |
| 4 | 540 | \ | \ | \ |
| 5 | 1620 | \ | \ | \ |
| 6 | 4360 | \ | \ | \ |
| 7 | 1550 | 860 | \ | \ |
| 8 | 1630 | \ | 690 | \ |
| 9 | 1490 | \ | 820 | 2100 |
| 10 | 1570 | 910 | 870 | 2060 |
| 11 | 260 | \ | \ | \ |
| 12 | 190 | \ | \ | \ |
| 13 | 230 | \ | \ | \ |
| 14 | 1540 | \ | \ | \ |
| 15 | 1610 | \ | \ | \ |
| 16 | 1520 | \ | \ | \ |
| 17 | 1630 | \ | \ | 1720 |
| 18 | 310 | \ | \ | \ |
| 19 | 1370 | \ | \ | \ |
| 20 | 1270 | \ | \ | \ |
| 21 | 1410 | \ | \ | 1260 |
| 22 | 1460 | \ | \ | \ |
| 23 | 1560 | \ | \ | \ |
| 24 | 360 | \ | \ | \ |

Coating treatment is not performed on the electrode active materials numbered 11 to 13, 18, and 24. Because a raw material precursor contains elemental sulfur, the electrode active materials inevitably contain trace amounts of residual element sulfur (<400 ppm).

(4) Lithium-ion secondary batteries are assembled by using the electrode active materials numbered 1 to 24 based on the foregoing methods, and tested for performance. Results are as follows:

TABLE 5

| Number | First cycle discharge capacity (mAh/g) | Capacity retention rate* (%) | | Direct current resistance* (mΩ) | | Gas production at 70° C. Volume change rate (%) | |
|---|---|---|---|---|---|---|---|
| | | 100 cycles | 500 cycles | 100 cycles | 500 cycles | 10 days | 50 days |
| 1 | 197 | 96.2 | 90.1 | 17.7 | 28.7 | 7.38% | 31.08% |
| 2 | 188 | 96.5 | 90.7 | 17.6 | 18.7 | 0.09% | 7.25% |
| 3 | 179 | 97.5 | 93.9 | 16.6 | 16.8 | 0.21% | 5.68% |
| 4 | 196 | 96.7 | 91.5 | 17.1 | 27.5 | 7.71% | 28.14% |
| 5 | 197 | 96.8 | 91.3 | 19.5 | 25 | 8.50% | 33.81% |
| 6 | 195 | 96.6 | 90.9 | 19 | 25 | 8.83% | 33.15% |
| 7 | 198 | 97 | 90.9 | 19 | 25 | 8.69% | 42.86% |
| 8 | 197 | 97 | 91.6 | 17.7 | 25 | 10.10% | 36.80% |
| 9 | 197 | 97.2 | 92.1 | 17.7 | 24.6 | 8.24% | 24.99% |
| 10 | 198 | 97.2 | 92.4 | 17.5 | 24.6 | 7.00% | 19.60% |
| 11 | 194 | 96.4 | 86.4 | 19.8 | 30 | 7.40% | 52.40% |
| 12 | 187 | 95.7 | 86.5 | 19.8 | 24.3 | 1.75% | 15.36% |
| 13 | 179 | 97.1 | 90.5 | 19.1 | 21 | 2.47% | 12.13% |
| 14 | 191 | 95.9 | 85.7 | 19 | 35.4 | 5.22% | 65.30% |
| 15 | 190 | 96.1 | 88.7 | 17.4 | 23.6 | 4.57% | 60.04% |
| 16 | 191 | 95.9 | 88.2 | 16.7 | 22.9 | 11.21% | 32.49% |
| 17 | 190 | 96.2 | 90.2 | 17.4 | 18.7 | 15.71% | 35.23% |
| 18 | 189 | 95.7 | 83.9 | 14.1 | 74.3 | 8.39% | 85.40% |
| 19 | 199 | 95.8 | 85.4 | 17.9 | 20.3 | 10.60% | 48.40% |
| 20 | 198 | 96.7 | 91.4 | 17.5 | 20 | 11.90% | 53.60% |
| 21 | 197 | 96.7 | 91 | 18.2 | 20.7 | 12.20% | 54.60% |
| 22 | 199 | 96.8 | 91.9 | 17.1 | 18.2 | 15.70% | 49.60% |
| 23 | 198 | 96.9 | 91.7 | 17.4 | 18.4 | 15.10% | 50.40% |
| 24 | 196 | 94.3 | 79.8 | 18.5 | 55.2 | 22.00% | 72.50% |

*Capacity retention rate and direct current impedance are tested at a preset environmental temperature of 45° C.

(5) Slurry Processing Performance:

The electrode active material numbered 23 was used to prepare a slurry in environment with a relative humidity of 2% and 45%, respectively, with the following formulation: the electrode active material, conductive carbon black, and a binder PVDF were mixed at a mass ratio of 96:2.5:1.5 A solvent N-methyl-pyrrolidone (NMP) was added, with a mass of the solvent accounting for 30% of a total weight of the slurry, and a resulting mixture was stirred to form a uniform positive-electrode slurry. The slurries prepared in environment with two different humidity were left standing, and viscosities of the electrode slurries were analyzed at regular intervals by using a rheological analyzer (Gemini 150 Rheometer, Malvern Instruments ltd).

In addition, based on the foregoing testing method, the sample numbered 24 was also treated in the same way and taken as a reference group, and results are shown in the following table:

TABLE 6

| | Number | | | |
|---|---|---|---|---|
| Standing time (h) | No. 23 2% RH Viscosity (mPa*s) | No. 23 45% RH Viscosity (mPa*s) | No. 24 2% RH Viscosity (mPa*s) | No. 24 45% RH Viscosity (mPa*s) |
| 0 | 8300 | 9490 | 12700 | 11350 |
| 1 | 10100 | 10650 | 13450 | 16400 |
| 2 | 12800 | 10050 | 15700 | 24500 |
| 4 | 13200 | 12650 | 17600 | 47300 |
| 12 | 14650 | 13800 | 20050 | >50000 |
| 24 | 15300 | 16000 | 22750 | ∞ |
| 48 | 17300 | 17500 | 22550 | ∞ |

∞ indicates that the viscosity is too high to be measured accurately.

The electrode active material numbered 17 was used to prepare a slurry in environment with a relative humidity of 2% and 45%, respectively, with the following formulation: the electrode active material, conductive carbon black, and a binder PVDF are mixed at a mass ratio of 96:2.5:1.5. A solvent N-methyl-pyrrolidone (NMP) was added, with a mass of the solvent accounting for 30% of a total weight of the slurry, and a resulting mixture was stirred to form a uniform positive-electrode slurry. The slurries prepared in environment with two different humidity were left standing, and viscosities of the electrode slurries were analyzed at regular intervals by using a rheological analyzer (Gemini 150 Rheometer, Malvern Instruments ltd).

In addition, based on the foregoing testing method, the sample numbered 18 was treated in the same way and taken as a reference group, and results are shown in the following table:

TABLE 7

| | Number | | | |
|---|---|---|---|---|
| Standing time (h) | No. 17 2% RH Viscosity (mPa*s) | No. 17 45% RH Viscosity (mPa*s) | No. 18 2% RH Viscosity (mPa*s) | No. 18 45% RH Viscosity (mPa*s) |
| 0 | 10780 | 9760 | 8680 | 12100 |
| 1 | 12650 | 13780 | 10260 | 22380 |
| 2 | 14760 | 14760 | 12650 | 36590 |
| 4 | 15290 | 15870 | 14870 | 48820 |
| 12 | 16870 | 17230 | 17530 | >50000 |
| 24 | 18540 | 19430 | 20120 | ∞ |
| 48 | 19520 | 20360 | 21000 | ∞ |

∞ indicates that the viscosity is too high to be measured accurately.

From the foregoing experimental data, it can be learned that compared to the electrode active materials (No. 18 and 24) without a coating layer, the electrode active materials (No. 17 and 23) with a coating layer have improved processing performance. Specifically, the electrode active materials (No. 17 and 23) with a coating layer have relatively low viscosity and no obvious gelation in appearance by visual observation, no matter whether the slurry is prepared at 2% or 45% relative humidity. Such a slurry is beneficial to subsequent processes of coating and cold pressing, and beneficial to improving electrical performance of the battery.

From the foregoing experimental data, it can be learned that a coating layer containing a reaction product of a lithium-containing compound and a sulfur-containing compound can improve performance of the electrode active material. Compared to the electrode active materials (No. 11-13, 18, and 24) without a coating layer, the electrode active materials (No. 1-10, 14-17, and 19-23) with a coating layer have the following beneficial effects:
1) Increased specific capacity;
2) Improved cycling performance;
3) Reduced direct current resistance;
4) Lower gas production;
5) Relatively good performance at a higher voltage; and
6) Stable production and processing at high relative humidity.

Figure 3:
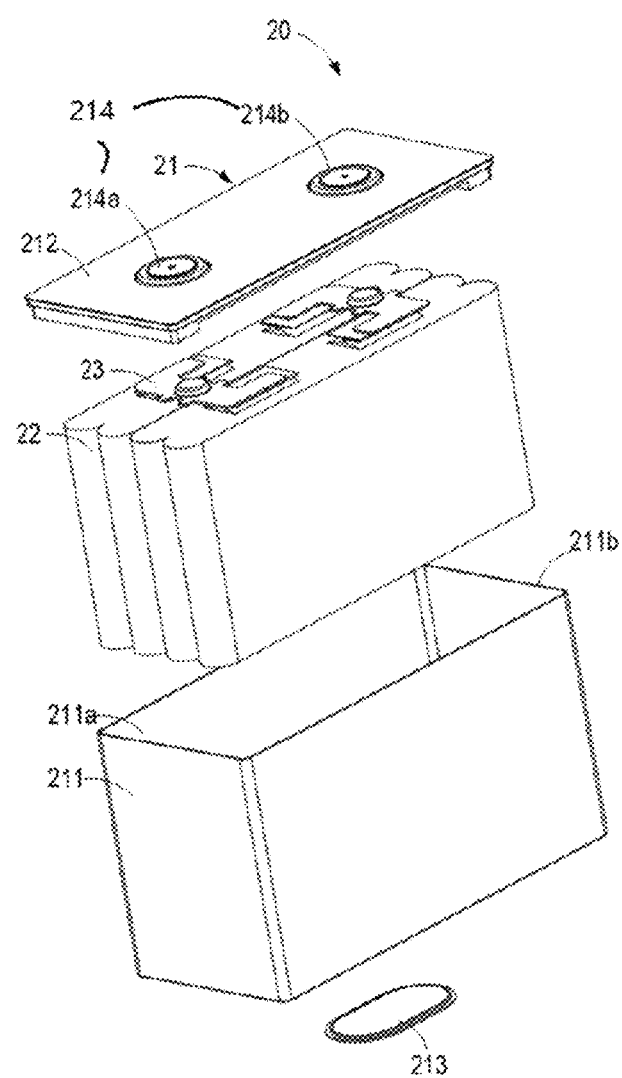
FIG. 3 is a schematic diagram of a battery according to an embodiment of this application.
Figure 4:
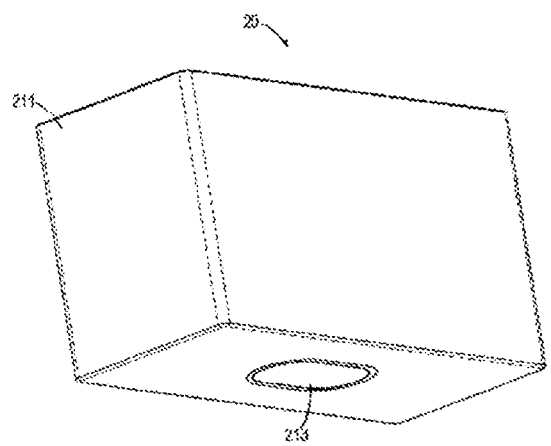
FIG. 4(A) is a schematic diagram of a housing of a battery.
FIG. 4(B) is a schematic diagram of the housing and a cover plate of the battery.
Figure 4:
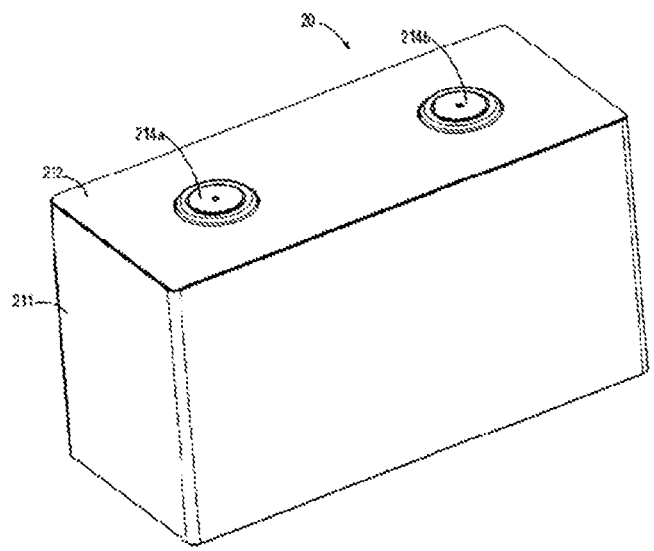

According to some embodiments of this application, this application provides a battery. FIG. 3 shows a battery 10 according to an embodiment of this application. FIG. 4(A) is a schematic diagram of a housing of a battery, and FIG. 4(B) is a schematic diagram of the housing and a cover plate of the battery. As shown in FIG. 3 and FIG. 4, in this embodiment, the battery may also be referred to as a battery cell 20. The battery cell 20 includes a housing 21, an electrode assembly 22, and an electrolyte, where the electrode assembly 22 is accommodated in the housing 21 of the battery cell 20, and the electrode assembly 22 includes a positive-electrode plate, a negative-electrode plate, and a separator. The separator may be the separator prepared in the embodiments of this application. The electrode assembly 22 may be a wound structure or a stacked structure, and may, for example, be the structure actually used in the embodiments of this application. The housing 21 includes a shell 211 and a cover plate 212. The shell 211 includes an accommodating cavity 211a formed by a plurality of walls, and an opening 211b. The cover plate 212 is disposed on the opening 211b to seal the accommodating cavity 211a. In addition to the electrode assembly 22, the accommodating cavity 211a further accommodates the electrolyte. The positive-electrode plate and the negative-electrode plate of the electrode plate assembly 22 are generally provided with tabs. The tabs generally include a positive-electrode tab and a negative-electrode tab. According to some embodiments of this application, a plurality of positive-electrode tabs are provided and stacked together, and a plurality of negative-electrode tabs are provided and stacked together. The tabs are connected to a positive-electrode terminal 214a and a negative-electrode terminal 214b outside the battery cell 20 through connection members 23. In the description of this application, the positive-electrode terminal 214a and the negative-electrode terminal 214b are collectively referred to as an electrode terminal 214. For a prismatic cell, the electrode terminal 214 may generally be disposed on the cover plate 212.

According to some embodiments of this application, this application provides an apparatus. The apparatus may include a mobile phone, a portable device, a laptop, an electric scooter, an electric vehicle, a steamship, a spacecraft, an electric toy, an electric tool, or the like. The spacecraft may include an airplane, a rocket, a space shuttle, a spaceship, or the like. The electric toy includes a fixed or mobile electric toy, such as a game console, an electric vehicle toy, an electric ship toy, and an electric airplane toy. The electric tool includes an electric metal cutting tool, an electric grinding tool, an electric assembly tool, and an electric railway-specific tool, such as an electric drill, an electric grinder, an electric wrench, an electric screwdriver, an electric hammer, an electric impact drill, a concrete vibrator, and an electric planer.

Figure 5A:
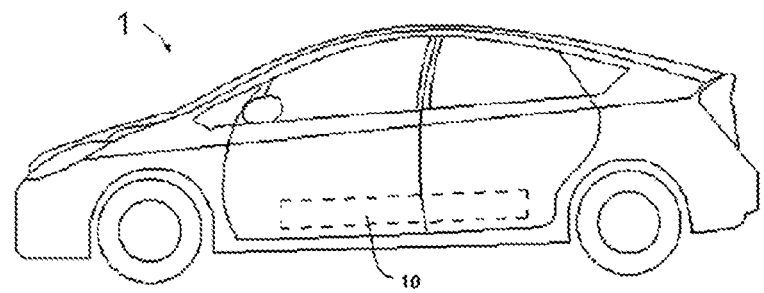
FIG. 5(A) and FIG. 5(B) respectively show a side view and a bottom view of a vehicle according to an embodiment of this application.
Figure 5:
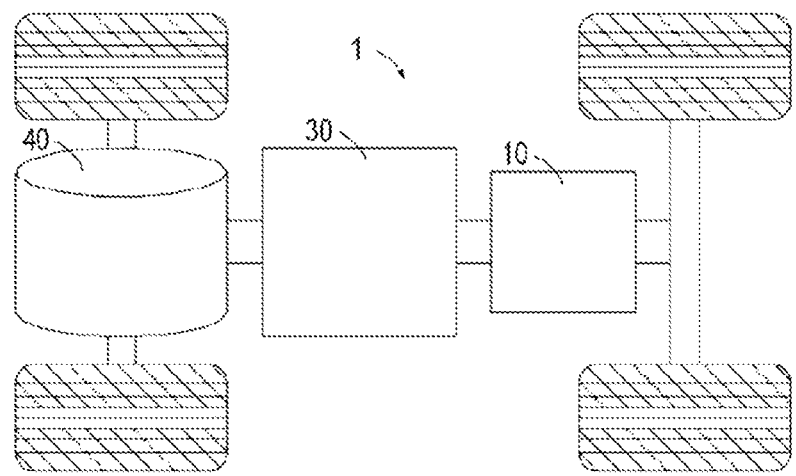

In this embodiment, the apparatus includes a vehicle. For example, FIG. 5(A) and FIG. 5(B) respectively show a side view and a bottom view of a vehicle according to an embodiment of this application. The vehicle may be an oil-fueled vehicle, a gas-powered vehicle, or a new energy vehicle. The new energy vehicle may be a battery electric vehicle, a hybrid electric vehicle, an extended-range electric vehicle, or the like. As shown in FIG. 5(A), a battery 10 may be disposed in the vehicle 1. As shown in FIG. 5(A), the battery 10 is disposed at the bottom of the vehicle. However, the battery 10 may alternatively be disposed at the head or the tail of the vehicle 1 as required. When the vehicle is driven, the battery 10 may intermittently or continuously supply power to the vehicle 1. For example, the battery 10 may supply electrical energy to apparatuses of the vehicle 1 such as a lamp, a liquid crystal display, and an igniter. For a hybrid electric vehicle or an electric vehicle, the battery 10 may also supply driving power to the vehicle 1. As shown in FIG. 5(B), the vehicle 1 may further include a controller 30 and a motor 40, and the controller 30 is configured to control the battery 10 to supply power to the motor 40, for example, to satisfy a working electricity need during start, navigation, and driving of the vehicle 1. In another embodiment of this application, the battery 10 not only can be used as an operational power supply for the vehicle 1, but also can be used as a driving power supply for the vehicle 1, to totally or partially replace fossil fuel or natural gas to provide driving power for the vehicle 1. According to an embodiment of this application, the battery 10 used in the vehicle may alternatively be a battery pack that includes a plurality of battery cells 20 shown in FIG. 3 to FIG. 4.

The foregoing descriptions are merely specific embodiments, but are not intended to limit the protection scope. Any equivalent modifications or replacements readily figured out by a person skilled in the art within the technical scope disclosed in this application shall fall within the protection scope. Therefore, the protection scope shall be subject to the protection scope of the claims.

What is claimed is:

1. An electrode active material comprising:
a core comprising a ternary material selected from the group consisting of lithium nickel cobalt manganese oxide, lithium nickel cobalt aluminum oxide, and a combination thereof; and
a coating layer disposed on at least part of a surface of the core, wherein the coating layer is formed by curing a solution disposed on the surface of the core, the solution comprises an organic sulfur-containing compound, and the coating layer is a reaction product of the organic sulfur-containing compound and comprises Li, S, and O,
wherein the organic sulfur-containing compound comprises one selected from the group consisting of mercaptan, thiophenol, thioether, thioaldehyde, thioketone, thiocarboxylic acid, sulfoxide, sulfone, sulfur oxoacid, a derivative of sulfur oxoacid, and any combination thereof.

2. The electrode active material according to claim 1, wherein the sulfur oxoacid is selected from the group consisting of sulfonic acid, sulfinic acid, sulfenic acid, and any combination thereof.

3. The electrode active material according to claim 1, wherein the derivative of sulfur oxoacid is selected from the group consisting of an ester of the sulfur oxoacid, an acyl halide of the sulfur oxoacid, an amide of the sulfur oxoacid, and a lithium amide salt of the sulfur oxoacid, and any combination thereof.

4. The electrode active material according to claim 1, wherein the organic sulfur-containing compound is selected from the group consisting of R1-S(=O)$_2$—R2, R1-C(=S)—R2,

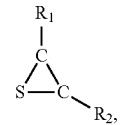

R1-C—S—C—R2, or R1-S(=O)$_2$—LiN—S(=O)$_2$—R2, wherein R1 and R2 are each independently selected from the group consisting of hydroxyl, amino, $C_{1-6}$ alkyl, aryl, halogen, and hydrogen.

5. The electrode active material according to claim 4, wherein the organic sulfur-containing compound comprises R1-S(=O)$_2$—R2, wherein R1 is hydroxyl, and R2 is selected from the group consisting of amino, $C_{1-6}$ alkyl, and halogen.

6. The electrode active material according to claim 4, wherein the organic sulfur-containing compound comprises R1-C(=S)—R2, wherein R1 is hydroxyl, and R2 is selected from the group consisting of amino, $C_{1-6}$ alkyl, and halogen.

7. The electrode active material according to claim 4, wherein the organic sulfur-containing compound comprises

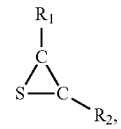

wherein R1 and R2 each are hydrogen or $C_{1-6}$ alkyl.

8. The electrode active material according to claim 4, wherein the organic sulfur-containing compound comprises R1-C—S—C—R2, wherein R1 and R2 each are hydrogen or $C_{1-6}$ alkyl.

9. The electrode active material according to claim 4, wherein the organic sulfur-containing compound comprises R1-S(=O)$_2$—LiN—S(=O)$_2$—R2, where R1 and R2 each are halogen.

10. The electrode active material according to claim 1, wherein the organic sulfur-containing compound further comprises one selected from the group consisting of sulfamide, aminomethanesulfonic acid, lithium bisfluorosulfonimide, thio-propionamide, thio-isobutyramide, propylene sulfide, methyl ethyl sulfide, and any combination thereof.

11. The electrode active material according to claim 1, wherein the solution further comprises a lithium containing compound selected from the group consisting of $Li_2O$, LiOH and $Li_2CO_3$, $LiNO_3$, $LiPF_6$, lithium oxalate, lithium acetate, $LiClO_4$, $LiBF_4$, $LiCF_3SO_3$, $LiAsF_6$, $LiAlCl_4$, LIN$(CF_3SO_2)_2$, $LiC(SO_2CF_3)_3$, and any combination thereof.

12. The electrode active material according to claim 1, wherein a weight content of S in the electrode active material is 500-5000 ppm.

13. The electrode active material according to claim 1, wherein the solution further comprises a boron-containing compound, the reaction product further comprises B, and a weight content of B in the electrode active material is 500-3000 ppm.

14. The electrode active material according to claim 1, wherein the solution further comprises a phosphorus-containing compound, the reaction product further comprises P, and a weight content of element P in the electrode active material is 200-1500 ppm.

15. The electrode active material according to claim 1, wherein the solution further comprises a fluorine-containing compound, the reaction product further comprises F, and a weight content of element F in the electrode active material is 500-3000 ppm.

16. The electrode active material according to claim 1, wherein a chemical formula of the lithium nickel cobalt manganese oxides is $Li_xNi_aCo_bMn_cM^1{}_{(1-a-b-c)}O_2$, wherein $0.5 \leq x \leq 1.2$, $0.3 < a \leq 1$, $0 < b \leq 0.5$, $0 < c \leq 0.6$, and $M^1$ is selected from one or more of Zr, Zn, Ti, Sr, Sb, Y, W, Al, B, P, and F; and a chemical formula of the lithium nickel cobalt aluminum oxides is $Li_xNi_dCo_eAl_fM^2{}_{(1-d-e-f)}O_2$, wherein $0.5 \leq x \leq 1.2$, $0.5 < d \leq 1$, $0 < e \leq 0.5$, $0 < f \leq 0.5$, and $M^2$ is selected from one or more of Zr, Mg, Ba, Ti, Sr, Sb, Y, W, and B.

17. The electrode active material according to claim 1, wherein a particle size $D_v50$ of the electrode active material is 1-25 μm.

18. A method of making an electrode active material comprising a core and a coating layer, the method comprising:

providing a core comprising a ternary material selected from the group consisting of lithium nickel cobalt manganese oxide, lithium nickel cobalt aluminum oxide, or a combination thereof;

providing a solution comprising an organic sulfur-containing compound, the organic sulfur-containing compound;

applying the solution on at least a surface of the core; and curing the solution to form the coating layer disposed on the surface of the core, wherein the coating layer comprises a reaction product of the organic sulfur-containing compound, and the reaction product comprises Li, S, and O, wherein the organic sulfur-containing compound is selected from the group consisting of mercaptan, thiophenol, thioether, thioaldehyde, thioketone, thiocarboxylic acid, sulfoxide, sulfone, sulfur oxoacid, a derivative of sulfur oxoacid, and any combination thereof.

19. The method according to claim 18, wherein the organic sulfur-containing compound further comprises one selected from the group consisting of sulfamide, aminomethanesulfonic acid, lithium bisfluorosulfonimide, thiopropionamide, thio-isobutyramide, propylene sulfide, methyl ethyl sulfide, and any combination thereof.

20. The method according to claim 18, wherein the solution further comprises a lithium containing compound selected from the group consisting of $Li_2O$, LiOH and $Li_2CO_3$, $LiNO_3$, $LiPF_6$, lithium oxalate, lithium acetate, $LiClO_4$, $LiBF_4$, $LiCF_3SO_3$, $LiAsF_6$, $LiAlCl_4$, $LiN(CF_3SO_2)_2$, $LiC(SO_2CF_3)_3$, and any combination thereof.

* * * * *